Aug. 30, 1932. S. N. BUCHANAN 1,874,435
SUPPORTING DEVICE
Filed July 10, 1930
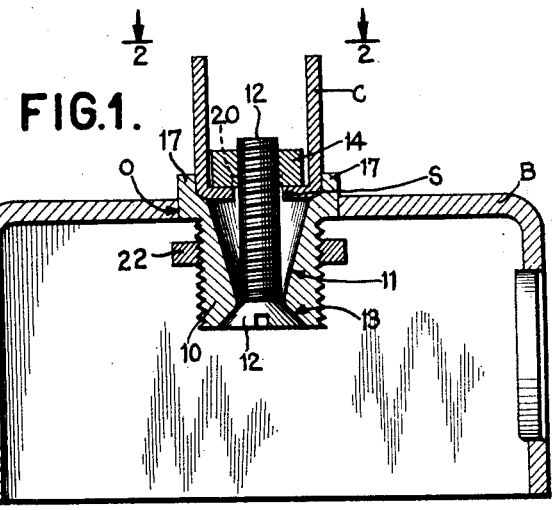
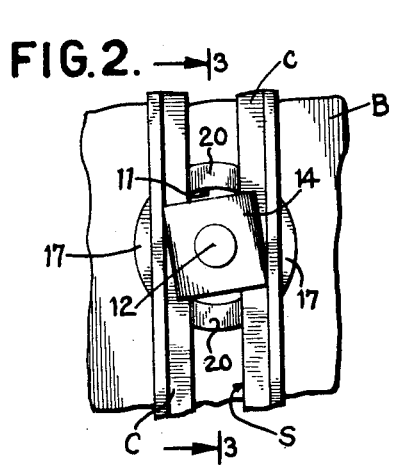
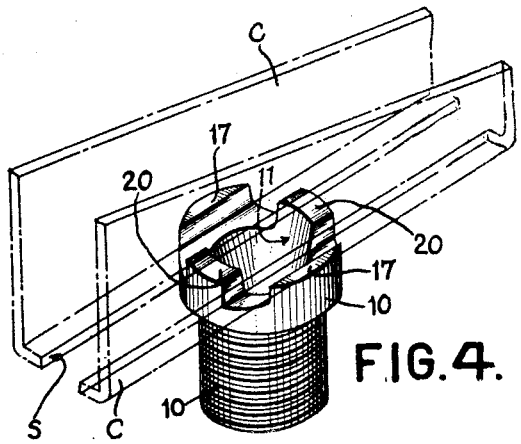
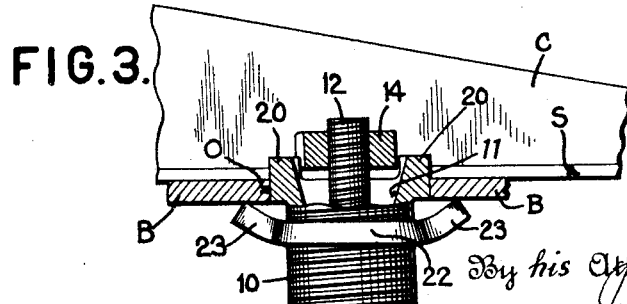
Inventor
STEPHEN N. BUCHANAN
By his Attorney
John M. Montstream Patented Aug. 30, 1932

1,874,435

UNITED STATES PATENT OFFICE

STEPHEN N. BUCHANAN, OF ELIZABETH, NEW JERSEY, ASSIGNOR TO THE THOMAS & BETTS CO., OF ELIZABETH, NEW JERSEY, A CORPORATION OF NEW JERSEY

SUPPORTING DEVICE

Application filed July 10, 1930. Serial No. 467,016.

This invention relates to supporting devices for outlet boxes and is particularly adapted for mounting an outlet box upon a bracket having parallel members spaced from each other so that the anchorage means which secures the supporting device to the bracket is prevented from turning by the parallel members of the bracket.

The supporting device is particularly adapted to secure an outlet box upon a U-shaped bracket which has two parallel flanges with a slot between the flanges through which a clamping means such as a clamping screw passes. A nut is threaded upon the screw and preferably is positioned between the two flanges of the bracket so that the nut is prevented from turning by the sides thereof. A screw and nut provide anchorage means to secure the supporting device to the bracket. In tightening the screw, the nut tends to rotate with the result that the corners of the nut act somewhat as wedges and force the sides of the U-shaped bracket apart thereby widening the slot so that the nut may pass through the slot. Even if this does not occur, the nut is insecurely seated upon the bracket and offers inefficient anchorage for the supporting device. Obviously the head of the screw may be square if desired and inserted between the sides of the bracket.

It is an object of this invention to construct a supporting device which provides means for preventing the spreading apart of the spaced parallel members of the bracket.

Another object of the invention is to provide projections upon the supporting device which engage the outer surfaces of the parallel members of the bracket and thereby prevent their spreading apart.

Another object of the invention is to provide means upon the supporting device which engage the supporting device anchorage means and prevent its rotation so that the parallel members of the bracket are not spread apart by the anchorage means.

Another object of the invention is to provide a supporting device having a pair of spaced grooves in its ends into which the spaced parallel members of the bracket are adapted to fit and thereby prevent their separation.

Other objects of the invention will be more apparent from the following description taken in connection with the accompanying drawing in which:

Figure 1 is a section through the supporting device, outlet box and bracket with the supporting device carrying the outlet box and secured to the U-shaped bracket.

Figure 2 shows the clamping nut positioned between the sides of the U-shaped bracket as viewed from line 2—2 of Figure 1.

Figure 3 is a partial section through the supporting device and the outlet box taken on line 3—3 of Figure 2.

Figure 4 shows in perspective the supporting member of the supporting device with the U-shaped bracket shown in dot and dash lines in its assembled position thereon.

The supporting devices such as the one to be described herein, are adapted to secure an outlet box B to a bracket C. In other words, the supporting device provides means for hanging an outlet box from a bracket which has parallel sides spaced from each other which bracket in its preferred form is U-shaped in cross-section and has a slot S extending longitudinally between and separating the two parallel sides or members of the bracket. The outlet box B is provided with an opening O to receive the supporting device as will be more fully described hereinafter.

The supporting device consists of a supporting member 10 having a conical shaped axial opening 11 through which an anchorage screw 12 passes. The supporting member 10 carries a countersink 13 at one end to receive the head of the clamping screw 12. The U-shaped clamping bracket C rests upon or is received by one end of the supporting member 10 so that the clamping screw 12 passes through the slot S in the bracket C and a clamping nut 14 is positioned between the parallel sides of the U-shaped bracket C and threaded upon the end of the clamping screw 12. The clamping nut 14 engages the U-shaped clamping bracket so that the bracket is clamped between the nut 14 and the end of the supporting member 10. By tightening the clamping screw 12 the supporting member 10 is firmly anchored to the bracket.

The clamping screw 12 and the clamping nut 14 together form the anchorage means by which the supporting device is secured to the bracket C. Obviously the invention contemplates any threaded anchorage means which is held against rotation by the parallel spaced sides of the bracket. It is immaterial how the anchorage means is assembled with respect to the supporting member and it may be either the screw or the nut which is held against rotation by the parallel sides of the bracket. Irrespective of which part of the anchorage means is positioned between the sides of the bracket, the part so positioned would tend to rotate when the anchorage means is tightened and thereby spread apart the parallel sides of the bracket.

The sides of the U-shaped bracket C are ordinarily positioned far enough apart so that the clamping nut 14 readily passes therebetween but is incapable of rotation. The sides of the bracket engage the sides of the nut and thereby prevent rotation of the nut. Tightening of the clamping screw 12 tends to rotate the clamping nut 14 which rotation is ordinarily restrained by the bracket. If sufficient power is exerted upon the clamping screw, however, the nut will turn and the corners will engage the sides of the U-shaped clamping member C and spread them apart. The spreading apart of the sides of the U-shaped bracket opens up the slot S and either permits the nut 14 to pass therethrough or offers an insecure support for the outlet box.

In order to avoid spreading apart of the sides of the U-shaped bracket, the supporting member 10 is provided with projections 17 engaging both sides of the U-shaped bracket C. The projections 17 provide means for preventing spreading of the U-shaped bracket. The supporting member 10 may also be described as having a groove in the end of the member into which the U-shaped bracket is inserted, the sides of the groove preventing spreading of the sides of the bracket.

The supporting member 10 may also be provided with one or more other projections 20 which project through the slot S of the bracket C. These projections engage the sides of the slot S of the bracket and prevent rotation of the supporting member upon the bracket. The projections 20 extend above the slot and between the sides of the bracket to engage the sides of the nut 14 in order to prevent rotation of the nut when the clamping screw 12 is tightened to clamp the supporting device to the bracket. The clamping nut 14 has therefore the projections 20 as well as the sides of the bracket C to prevent the rotation of the nut when the clamping screw 12 is tightened. The projections 20 of the supporting member 10 are rigid members which will not spread apart when the anchorage means is tightened. Obviously the projections 20 may prevent the rotation of the nut and afford additional safe guard with projections 17, against spreading apart of the sides of the bracket. The projections 20 may, however, be used even though the projections 17 are not provided and, similarly, the projections 17 may be provided without utilizing the projections 20.

The supporting member 10 is externally threaded to receive a box clamping nut 22. The ends 23 of the nut are bent upwardly so that the corners of the bent up ends engage the box B and clamp it in position against the bracket and supporting device, as will be described in greater detail hereinafter. Although the clamping nut secures the outlet box against the bracket, the nut may just as well clamp the box wholly upon the supporting member. The clamping nut 22 provides box clamping means for the supporting device.

In assembling the supporting device and the box B upon the bracket C, the supporting member 10 is placed in contact with the bracket so that the projections 17 of the supporting member engage the outer faces of the sides of the bracket C and the projections 20 project through the slot S in the bracket. The anchorage screw 12 is then projected through the center of the supporting member 10 and the nut 14 is inserted between the parallel sides of the bracket C and the anchorage screw 12 turned to thread the nut thereon so that the bracket C is clamped between the face of the nut 14 and the end or top of the supporting member 10. This firmly anchors the supporting device to the bracket. As previously described, the nut 14 is prevented from turning by the projections 20 engaging the sides of the nut assisted by the parallel sides of the bracket C. The projections 17 upon the supporting member engage the outer face of each of the sides of the bracket and thereby prevent expansion or spreading apart of these sides.

The outlet box B is then mounted upon the supporting device so that the outlet opening O seats upon the supporting member 10 and the top of the box contacts with the underside of the bracket C. The clamping nut 22 which provides box clamping means is then threaded upon the supporting member 10 until the corners of the bent up ends 23 contact with the box B and securely clamps the box between the nut 22 and the bottom of the bracket C. The box is thereby firmly clamped to the bracket C by means of the supporting device. It is clear that the clamping nut 22 may clamp the box wholly to the supporting member 10 and it is not essential that it be clamped against the bracket.

The invention described herein is not to be limited by the specific description in the specification nor by the disclosure in the drawing which is the preferred construction, but the invention is only to be limited by the accompanying claims:

What is claimed is:

1. A supporting device for securing an outlet box to a bracket having parallel members spaced from each other comprising a supporting member, means to anchor the supporting member to the bracket, means to clamp an outlet box upon the bracket, and projections upon the supporting member engaging the parallel members of the bracket to prevent spreading thereof.

2. A supporting device for securing an outlet box to a bracket having parallel members spaced from each other comprising a supporting member, anchorage means including a screw extending through the supporting member and a nut threaded upon the screw to anchor the supporting member to the bracket, one of the anchorage means being retained against rotation by the spaced parallel members of the bracket, means to clamp an outlet box upon the bracket, and projections upon the supporting member engaging the parallel members of the bracket to prevent spreading thereof.

3. A supporting device for securing an outlet box to a bracket having parallel members spaced from each other comprising a supporting member, an anchorage screw passing axially through the supporting member, an anchorage nut upon the screw and adapted to be held against rotation by the sides of the bracket, the screw and nut anchoring the supporting member to the bracket, means to clamp an outlet box upon the bracket, and projections upon the supporting member engaging the sides of the bracket to prevent spreading thereof.

4. A supporting device for securing an outlet box to a bracket having parallel members spaced from each other comprising a supporting member, anchorage means to secure the supporting member to the bracket including a screw extending through the supporting member, and a nut upon the screw, the parallel spaced members of the bracket holding the anchorage means against rotation, means to clamp an outlet box to the bracket, and a groove in the end of the supporting member to receive the spaced parallel members of the bracket and prevent their spreading apart.

5. A supporting device for securing an outlet box to a bracket having parallel members spaced from each other comprising a supporting member, anchorage means to secure the supporting member to the bracket including a screw extending through the supporting member, and a nut upon the screw, the parallel spaced members of the bracket holding the anchorage means against rotation, means to clamp an outlet box to the bracket, a pair of grooves in the end of the supporting member to receive the spaced parallel members of the bracket to prevent their spreading apart, and projections formed in the end of the supporting member by the grooves which project between the parallel members of the bracket engaging and preventing the rotation of one of the anchorage means.

In testimony whereof I affix my signature.

STEPHEN N. BUCKANAN.